US005773490A

United States Patent [19]
Shikinami et al.

[11] Patent Number: 5,773,490
[45] Date of Patent: Jun. 30, 1998

[54] PRESSURE SENSITIVE ADHESIVE FOR TRANSDERMAL ABSORPTION FORMULATIONS

[75] Inventors: Yasuo Shikinami; Kunihiro Hata, both of Osaka, Japan

[73] Assignee: Takiron Co., Ltd., Osaka, Japan

[21] Appl. No.: 605,584

[22] Filed: Feb. 22, 1996

Related U.S. Application Data

[63] Continuation of Ser. No. 422,762, Apr. 14, 1995, abandoned, which is a continuation of Ser. No. 81,311, filed as PCT/JP91/01507 Nov. 2, 1991 published as WO93/08796 May 13, 1993, abandoned.

[51] Int. Cl.$^6$ .................................. C09J 4/00; C08J 3/00; C08K 3/20; C08L 75/00
[52] U.S. Cl. .................. 523/118; 156/331.1; 156/331.7; 524/590; 528/49; 528/60; 528/66
[58] Field of Search .................................. 528/60, 66, 49; 524/590; 156/331.1, 331.7; 523/118

[56] References Cited

U.S. PATENT DOCUMENTS

| | | | |
|---|---|---|---|
| 3,796,678 | 3/1974 | Bartizal | 524/590 |
| 3,939,123 | 2/1976 | Matthews et al. | 528/60 |
| 4,855,077 | 8/1989 | Shikinami et al. | 252/519 |
| 5,045,601 | 9/1991 | Capelli et al. | 528/66 |

FOREIGN PATENT DOCUMENTS

| | | |
|---|---|---|
| 0245858 | 11/1987 | European Pat. Off. . |
| 2542998 | 9/1984 | France . |
| 57-139347 | 8/1982 | Japan . |
| 60-72556 | 4/1985 | Japan . |
| 61-172816 | 8/1986 | Japan . |
| 62-230715 | 10/1987 | Japan . |
| 2-229876 | 9/1990 | Japan . |
| 4-013618 | 1/1992 | Japan . |
| 4-013620 | 1/1992 | Japan . |
| 88/01877 | 3/1988 | WIPO . |
| 88/01878 | 3/1988 | WIPO . |

OTHER PUBLICATIONS

Supplementary European Search Report for Application No. EP 91 91 8940.

*Primary Examiner*—Patrick D. Niland
*Attorney, Agent, or Firm*—Varndell Legal Group

[57] ABSTRACT

Pressure sensitive adhesives for transdermal absorption formulations comprising a segmented polyurethane, which can control dissolution and a releasing property of drugs of various kinds which are solid at normal temperature; said segment being an alkylene oxide chain which is in a liquid state at a temperature of around normal temperature to around body temperature, and said segment containing a hydrophilic alkylene oxide chain and a hydrophobic alkylene oxide chain, or comprising one or both of them and an alkylene oxide chain in which a hydrophilic moiety and a hydrophobic moiety are present in the mixed manner.

10 Claims, No Drawings

PRESSURE SENSITIVE ADHESIVE FOR TRANSDERMAL ABSORPTION FORMULATIONS

CROSS-REFERENCE TO RELATED APPLICATIONS

This is a continuation application of U.S. Ser. No. 08/422,762, filed on Apr. 14, 1995, now abandoned, which is a continuation of U.S. Ser. No. 08/081,311, filed on Jun. 24, 1993, abandoned, which is a national phase application of International Application No. PCT/JP91/01507, filed Nov. 2, 1991.

TECHNICAL FIELD

The present invention relates to pressure sensitive adhesives for transdermal absorption formulations comprising a segmented polyurethane, which can control dissolution and a releasing property of drugs, particularly drugs of various kinds which are solid at normal temperature.

BACKGROUND ART

Transdermal absorption formulations are used by adhering to human skin to let drugs transdermally absorbed for a local affected part or whole body in a manner that a releasing amount is controlled. The drug formulations have less anxiety such as adverse effect in comparison with drug administration routes such as oral or injection. Therefore, recently the transdermal absorption formulations have been vigorously studied.

Generally, it is necessary for pressure sensitive adhesives used in these transdermal absorption formulations to satisfy the following fundamental requirements. Namely, the requirements are to be able to contain a drug at least in such an amount that a pharmacologically effective amount of the drug can be released, and to be able to contain a drug homogeneously in view of drug-releasing control (for such purpose, it being most desirable to dissolve a drug homogeneously), further to adhere well to the skin to form an essentially continuous boundary surface between the pressure sensitive adhesive and the skin so that the drug in a dissolved form can smoothly transfer to the skin, and furthermore to be highly safe against human body.

Hitherto, as pressure sensitive adhesives for medical use there are popularly employed rubber type and acrylic type adhesives (for example, JP-A-134020/1983, Japanese Pharmacopoeia, 12th ed. Explanation (1991), item of Adhesive plaster) and, in the specific use, silicone type adhesives (for example. Proc. Int. Symp. Control. Rel. Bioact. Master., 16, 41 (1989), Proc. Int. Symp. Control. Rel. Bioact. Master., 16, 175 (1989)). The rubber type adhesives are prepared by using rubber components (for example, NR, IR, SBR, and the like) as base materials, and adding thereto tackifiers such as rosin, coumaron-indene or terpene resins and, as softening agents, low molecular liquid polymers such as polybutene, polyisobutylene or naphthene oils. As same above, the acrylic type adhesives are prepared by selecting a kind of alkyl esters of (meth)acrylic acid so as to be suitable to each of the fundamental three components which are required for pressure sensitive adhesives, i.e. an adhesive component (pressure sensitive adhesion), an agglomerating component (cohesion, tackiness) and a modifying component.

In addition, as hydrogel type adhesives, there have been studied polysaccharide gums of natural polymers such as Karaya rubber, hydrogels of highly water-absorbing resins such as an acrylic acid (salt)-grafted starch and a modified poly(vinyl alcohol), and the like (for example, Japanese Pharmacopoeia, 12th ed. Explanation (1991), item of Shaped cataplasm).

When using those pressure sensitive adhesives as adhesives for transdermal absorption formulations, however, there are the following problems.

Namely, in case of the above-mentioned rubber type adhesives and the acrylic type adhesives, the dissolution of drugs into those adhesives, particularly drugs which are solid at normal temperature is mainly due to the dissolution to the softening agents and the tackifiers which are the liquid components of the adhesives. Accordingly, the adhesives are prepared by simply admixing drugs with compositions which are formulated with consideration of the characteristics of pressure sensitive adhesives, rather than being prepared with consideration of material combinations suitable to control dissolution and a releasing property of drugs. Thus, they always have problems that a solubility, a storage life and a releasing property of drugs are not sufficient. Further there is a danger that the liquid components such as the softening agents and the tackifiers are simultaneously absorbed through the skin. In addition, there is an unavoidable problem that the drug-releasing control essentially depends on the absorption properties of those liquid components. In case of the silicone type adhesives, a solubility, a permeability and a releasing property of hydrophilic drugs are poor.

On the other hand, in case of the polysaccharide gums, they have advantages such as a strong adhesion strength and a high safety against human body. However, there are problems that the adhesion strength becomes low when absorbing sweat from human body and that various germs are easy to glow during a long storage.

The hydrogels of highly water-absorbing resins are not practically usable because the adhesion property disappears when water is evaporated by drying, and have a problem that dissolution of hydrophobic drugs is difficult.

The present invention has been made by considering those problems, and its object is to provide pressure sensitive adhesives for transdermal absorption formulations which are highly safe against human body, soft and excellent in adhesion strength and fitness, good in feeling and compatibility when applied, and further capable of controlling very well dissolution and a releasing property of drugs, particularly various solid drugs at normal temperature.

DISCLOSURE OF THE INVENTION

As a result of the inventor's intensive studies, the inventors have found the fact that the object can be achieved by using the pressure sensitive adhesives for transdermal absorption formulations, which comprise one of (1) a segmented polyurethane having a hydrophilic alkylene oxide chain which is in a liquid state at a temperature of around normal temperature (about 0° to 30° C.) to around body temperature (about 30° C. to 40° C.) (hereinafter referred to as "normally liquid") and a normally liquid hydrophobic alkylene oxide chain, (2) a segmented polyurethane having only a normally liquid alkylene oxide chain in which a hydrophilic moiety and a hydrophobic moiety are present in the mixed manner, (3) a segmented polyurethane having a normally liquid alkylene oxide chain in which a hydrophilic moiety and a hydrophobic moiety are present in the mixed manner, and a normally liquid hydrophilic alkylene oxide chain and/or a normally liquid hydrophobic alkylene oxide chain, and then the present invention has been completed.

Generally, it is easy to find systems in which liquid drugs are dissolved in solid base resins, and the liquid drugs are relatively easy to be released. However, since solid drugs at normal temperature are difficult to be released as they are in the solid state, the solid drugs are necessarily released in the form of solution, thus a releasing system in which the solid drugs are dissolved in solvents must be considered. Namely, there is employed a method in which the drugs are dissolved in solvents and absorbed through skin together with the solvents, or a method in which the drugs are dissolved in the tackifiers and the softening agents which are the liquid components of the above-mentioned rubber type adhesives and the acrylic type adhesives. As mentioned above, these methods have, however, a danger that the solvents or the liquid components of the adhesives are simultaneously absorbed through skin, and an unavoidable problem that the releasing control essentially depends on the absorption properties of those materials.

Taking account of those matters, the above problems have been solved according to the present invention. Namely, in order to release solid drugs, it is fundamental to dissolve them in liquid materials. The essential matter of the present invention is to employ, as the liquid materials, the liquid segments of segmented polyurethane, i.e. the segments which are in a liquid state at around normal temperature or ambient temperature to around body temperature. In addition, since the segments can be freely selected from either hydrophilic segments or hydrophobic segments, it is possible to dissolve various drugs in a wider range. Further it is also possible to adjust the releasing control in an easy manner by selecting a balance between the hydrophilic segments and the hydrophobic segments.

The pressure sensitive adhesives for transdermal absorption formulations comprising the segmented polyurethane which is in the state of adhesive gel are, for instance, interpenetrated network type segmented polyurethanes having an adhesion property, which are prepared by reacting one or more of the polyol component A represented by the structural formulae (I) to (IV) with one or more of the polyisocyanate component B represented by the structural formulae (V) to (VIII) in the absence or in the presence of catalysts such as dibutyltin dilaurate.

(Polyol component A)
Structural formula (I)-1
HO—(AO)—CONHR¹NHCOO—(AO)—CONHR¹NHCOO—(AO)—H
Structural formula (I)-2
HO—(AO)—CONHR¹NHCOOR²OCONHR¹NHCOO—(AO)—CONHR¹NHCOOR²OCONHR¹NHCOO—(AO)—H
　　　　　　　　　　　　　　　　　　|　　　　　　　　　　　　　　　　　　　　　　　　　　　　　　　　|
　　　　　　　　　　　　　　　　　　OH　　　　　　　　　　　　　　　　　　　　　　　　　　　　　　　OH wherein $R^1$, $R^2$ are the same or different, and each is an alkylene group, preferably an alkylene group having 1 to 7 carbon atoms, or a bivalent residue of an alicyclic compound or aromatic compound, preferably phenylene, xylylene, naphthalene, or the like and (AO) is an alkylene oxide chain.

Structural formula (II)
CH₂O—(AO)—H
|
[HCO—(AO)—H]$_l$
|
CH₂O—(AO)—H

Structural formula (III)
　　　　CH₂O—(AO)—H
　　　　|
CH₃CH₂—C—CH₂O—(AO)—H
　　　　|
　　　　CH₂O—(AO)—H wherein (AO) is an alkylene oxide chain, and l is 1 or 4.

Structural formula (IV)

RO—(AO)—H wherein (AO) is an alkylene oxide chain, and R is hydrogen atom, an alkyl group, preferably an alkyl group having 1 to 4 carbon atoms, an alicyclic group or an aryl group.

(Polyisocyanate compenent B)
Structural formula (V)-1
　　CH₂OCONHR³NCO　　　　　　　　　OCNR³NHCOOH₂C
　　|　　　　　　　　　　　　　　　　　　　　　　　　　　　　　　|
CH₃CH₂CCH₂OCONHR³NCO　　　　　　OCNR³NHCOOH₂CCCH₂CH₃
　　|　　　　　　　　　　　　　　　　　　　　　　　　　　　　　　|
　　CH₂OCONHR³NHCOO—(AO)—CONHR³NHCOOH₂C Structural formula (V)-2
CH₂OCONHR³NCO　　　　　　　　OCNR³NHCOOH₂C
|　　　　　　　　　　　　　　　　　　　　　　　　　　　　|
CHOCONHR³NCO　　　　　　　　　OCNR³NHCOOHC
|　　　　　　　　　　　　　　　　　　　　　　　　　　　　|
CH₂OCONHR³NHCOO—(AO)—CONHR³NHCOOH₂C Structural formula (VI)
CH₂O—(AO)—OCNHR³NCO
|
[CHO—(AO)—CONHR³NCO]$_l$
|
CH₂O—(AO)—CONHR³NCO Structural formula (VII)
　　　　CH₂O—(AO)—CONHR³NCO
　　　　|
CH₃CH₂CCH₂O—(AO)—CONHR³NCO
　　　　|
　　　　CH₂O—(AO)—CONHR³NCO Structural formula (VIII)
OCNR³NHCOO—(AO)—CONHR³NCO In the structural formulae (V) to (VIII), $R^3$ is an alkylene group, preferably an alkylene group of 1 to 7 carbon atoms, or a bivalent residue of an alicyclic compound or aromatic compound, preferably phenylene, xylylene, naphthalene or the like, and (AO) is an alkylene oxide chain, l is 1 or 4.

The polyol component A of the structural foumulae (I) to (IV) are explained hereinbelow.

The structural formula (I)-1 or (I)-2 represents a polyurethanepolyol prepolymer which is the reaction product of a polyetherpolyol and a diisocyanate, and both end portions thereof are constructed by the polyetherpolyol and both end groups are —OH. The diisocyanate compound used herein is the same as that in the polyurethanepolyisocyanate prepolymer described hereinafter. For example, there may be optionally used phenylenediisocyanate, 2,4-toluylenediisocyanate(TDI), 4,4'-diphenyl methane diisocyanate(MDI), naphthalene-1,5-diisocyanate, hexa methylene diisocyanate(HMDI), tetra methylene diisocyanate(TMDI), lysine diisocyanate, xylylene diisocyanate(XDI), hydrogenated TDI, hydrogenated MDI, dicyclohexyldimethyl methane-p,p'-diisocyanate, diethyl fumaratediisocyanate, isophorone diisocyanate (IPDI), and the like.

The structural formula (II) represents a polyol which is prepared by addition-reaction of a polyetherpolyol to glycerol (l=1) or sorbitol (l=4), and the structural formula (III) represents a polyol which is prepared by addition-reaction of a polyetherpolyol to trimethylolpropane. Also, there may be used an addition product of a polyetherpolyol and a polyalcohol such as

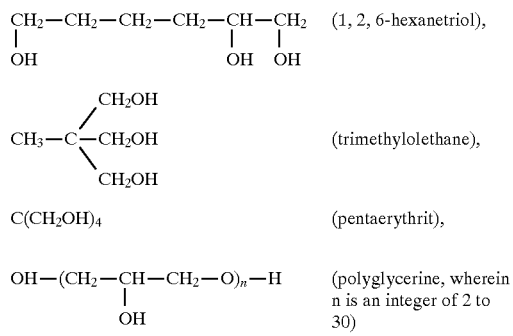

or a partial ester thereof.

The structrural formula (IV) represents a polyetherpolyol having an alkylene oxide chain, and includes a case that both end groups are —OH and a case that one end group is blocked with an alkyl group, an aryl group or the like. A one end blocked polyol, for instance with methyl, such as poly(ethylene glycol) monomethyl ether (M—PEG) acts as a tackifier as mentioned hereinafter.

Next, the isocyanate component B is explained. The structural formula (V)-1 represents a tetrafunctional tetraisocyanate prepared by dimerizing two molecules of a triisocyanate which is a reaction product of trimethylolpropane and a diisocyanate, with one molecule of a polyetherpolyol. The structural formula (V)-2 represents a tetraisocyanate prepared by using glycerol instead of trimethylolpropane. With respect to these tetraisocyanates, it is necessary to adjust the reaction delicately, since the triisocyanate is easy to be dimerized with two or three molecules of the polyetherpolyol. As a result of the adjustment, though an unreacted triisocyanate remains there, the remained triisocyanate may sometimes contributes to the control of an adhesion property of the adhesives, because the triisocyanate makes the molecular weight of the segmented polyurethane ununiform upon the reaction with the polyol component A.

The isocyanate of the structural formula (VI) is produced by reacting the polyol of the structural formula (II) with a diisocyanate, and the isocyanate of the structural formula (VII) is produced by reacting the polyol of the structural formula (III) with a diisocyanate. Both products are trifunctional. The isocyanate of the structural formula (VIII) is a reaction product of a polyetherpolyol and a diisocyanate, and is difunctional.

By reacting the above-mentioned polyol component A of the structural formulae (I)–(IV) and the isocyanate component B of the structural formulae (V)–(VIII), the segmented polyurethane having the alkylene oxide chain represented by (AO) as a segment can be obtained. In order to prepare a segmented polyurethane which dissolves and releases drugs well and has a good adhesion property and stickness to skin, and further is suitably usable as pressure sensitive adhesives for transdermal absorption formulations, it is necessary that both of the (AO) of the polyol component A and the (AO) of the isocyanate component B are the normally liquid alkylene oxide chains, and that the (AO) of one component is hydrophobic, and the (AO) of the other component is hydrophilic, or that both (AO) are those in which the hydrophilic moiety and the hydrophobic moiety are present in the mixed manner, or that the (AO) of one component is hydrophilic or hydrophobic and the (AO) of the other component is that in which the hydrophilic moiety and the hydrophobic moiety are present in the mixed manner.

As a morphology with molecular aggregation of segments composed of the polyalkylene oxide chains, there are a case of aggregation where one segment is composed of the same hydrophilic or hydrophobic monomer like a homopolymer; a case of aggregation where one segment is composed of linkage of hydrophilic chain blocks and hydrophobic chain blocks; a case of aggregation where one segment is composed of hydrophilic portions and hydrophobic portions which are not the block linkage, but randomly or alternately bonded with each other in the form of monomer unit; and a case of mixed system thereof.

Examples of the compounds which compose the alkylene oxide chain (AO) are polyetherpolyols such as poly(methylene glycol), poly(ethylene glycol), poly(propylene glycol), poly(butylene glycol), poly(tetramethylene glycol), poly(pentamethylene glycol), poly(hexamethylene glycol) and poly(heptamethylene glycol). Among them, there are suitably used poly (ethylene glycol) (PEG), poly(propylene glycol) (PPG), a low molecular poly(tetramethylene glycol) (PTMG) and poly(butylene glycol) (PBG) which are easily obtainable as a liquid material at normal temperature.

Further, there can be suitably used copolymers of those compounds, for example, block copolymers represented by

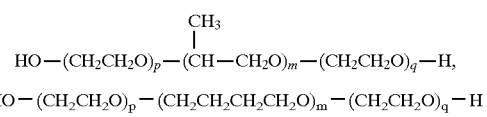

wherein m, p, q are an integer of one or more; and random copolymers prepared by randomly copolymerizing two or more of ethylene oxide(EO), propylene oxide(PO), tetramethylene oxide(TMO) or the like. The random copolymers may be any type of —(PO—EO—EO—PO)$_m$—, —(PO—PO—EO)$_m$—, —(EO—EO—PO)$_m$—, —(EO—PO—EO—PO)$_m$— (alternate copolymer), wherein m is an integar of one or more.

The alkylene oxide chain (AO) has an upper limit of molecular weight, because it must be normally liquid. Even if it is normally liquid, when a molecular weight is too low, a crosslinking density becomes high, which restricts the molecular motion of (AO). As a result, it is difficult to obtain a segmented polyurethane which has a good dissolution and a releasing property of drugs and a good adhesion property. In this viewpoint, a lower limit is defined. In case of PEG, when its molecular weight is about 1000 or more, it becomes solid, and when about 150 or less, its crosslinking density becomes too high. Therefore, a PEG having a molecular weight within the range of about 150 to 1000, preferably about 200 to 800 is used. This PEG gives a hydrophilic alkylene oxide chain because of a large percentage of the ether type oxygen. In case of PPG, even when its molecular weight is tens thousand it is still liquid. A PPG having a too large molecular weight is, however, difficult to react because a percentage of the end functional groups is small. Further the long chain does not give a segmented polyurethane having a good self supporting property. Accordingly, a PPG having a molecular weight within a range of about 200 to 3000 is preferably used. The PPG is fundamentally hydrophobic, because it has many methyl groups in the side chains even if its molecular weight is low, thus the PPG give a hydrophobic alkylene oxide chain. Since PTMG and PBG having a large polymerization degree become solid or highly viscous, there is preferably used PTMG or PBG having a molecular weight within a range of about 200 to 1000, preferably about 400 to 800. These glycols give a hydrophobic alkylene oxide chain.

On the other hand, when a compound giving the alkylene oxide chain (AO) is the above-mentioned block copolymer or the random copolymer, the state of the chain, i.e. liquid or solid, depends on a proportion of used comonomer, a molecular weight, and the like. For example, a block copolymer of PEG and PPG is in liquid state, when a molar fraction of PPG is high, even if the molecular weight is high. When the molecular weight of PEG is low, the block copolymer is also in liquid state even if the molar fraction of PPG is low. Therefore, when a copolymer is used, there may be used a copolymer in which a proportion and molecular weights of copolymerized components are optionally adjusted so that the copolymer is in liquid state. When the whole molecular weight of the copolymer is too high or too low, however, it is difficult to obtain a segmented polyurethane which has a good dissolution and releasing property of drugs and superiority in adhesion property and in self supporting property as mentioned above. Therefore, the whole molecular weight of the copolymer may falls within the range of about 150 to several thousands, preferably about 200 to 2000. When the block copolymer or random copolymer includes PEG or ethylene oxide (EO) as the copolymerized component in a certain portion, such a portion is hydrophilic and the other portion is hydrophobic to give (AO) having a hydrophilic portion and a hydrophobic portion. Alternatively, when PEG or EO is not included as a copolymerized component, a hydrophobic (AO) is formed.

The range of molecular weights of the polyol component A and the polyisocyanate component B varies in a wide range, depending on kinds, molecular configurations, or the like, of (AO) and isocyanate. This range is about 1000 to 10000 in polyurethanepolyol prepolymer of the structural formula (I), about 200 to 6000 in the polyols of the structural formulae (II) to (IV), about 500 to 10000 in the polyurethanepolyisocyanate prepolymers of the structural formulae (V) to (VIII). Preferably, each molecular weight may be selected within the range of about 1400 to 6000 (the structural formula (I)), about 300 to 3000 (the structural formulae (II) to (IV)) and about 1000 to 6000 (the structural formulae (V) to (VIII).

To obtain the pressure sensitive adhesives for transdermal absorption formulations according to the first aspect of the present invention, comprising a segmented polyurethane having a normally liquid hydrophilic alkylene oxide chain and a normally liquid hydrophobic alkylene oxide chain, the following reactions may be carried out. Namely, ① the polyol component A of the structural formulae (I) to (IV) in which (AO) is normally liquid hydrophilic PEG, is reacted with the isocyanate component B of the structural formulae (V) to (VIII) in which (AO) is any one selected from the above-mentioned polyetherpolyol such as a normally liquid hydrophobic PPG, a block copolymer which does not include PEG as a copolymerized component, or a random copolymer which does not include EO as a copolymerized component, or ② the polyol component A of the structural formulae (I) to (IV) in which (AO) is any one selected from the above-mentioned polyetherpolyol such as a normally liquid hydrophobic PPG, a block copolymer which does not include PEG as a copolymerized component, or a random copolymer which does not include EO as a copolymerized component, is reacted with the isocyanate component B of the structural formulae (V) to (VIII) in which (AO) is a normally liquid hydrophilic PEG.

To obtain the pressure sensitive adhesives for transdermal absorption formulations according to the second aspect of the present invention, comprising a segmented polyurethane having only a normally liquid alkylene oxide chain in which a hydrophilic moiety and a hydrophobic moiety are present in the mixed manner, the following reaction may be carried out. Namely, the polyol component A of the structural formulae (I) to (IV) in which (AO) is the above-mentioned normally liquid block copolymer or random copolymer including PEG or EO as a copolymerized component, is reacted with the isocyanate component B of the structural formulae (V) to (VIII) in which (AO) is also the above-mentioned normally liquid block copolymer or random copolymer including PEG or EO as a copolymerized component.

To obtain the pressure sensitive adhesives for transdermal absorption formulations according to the third aspect of the present invention, comprising a segmented polyurethane having a normally liquid alkylene oxide chain which comprises a mixture of a hydrophilic moiety and a hydrophobic moiety, and a normally liquid hydrophilic alkylene oxide chain and/or a normally liquid hydrophobic alkylene oxide chain, the following reaction may be carried out. Namely, ① the polyol component A of the structural formulae (I) to (IV) in which (AO) is the above-mentioned normally liquid block copolymer or random copolymer including PEG or EO as a copolymerized component, is reacted with the isocyanate component B of the structural formulae (V) to (VIII) in which (AO) is any one selected from the above-mentioned polyetherpolyol such as a hydrophobic normally liquid PPG, a block copolymer which does not include PEG as a copolymerized component, or a random copolymer which does not include EO as a copolymerized component, and/or the isocyanate component B of the formulae (V) to (VIII) in which (AO) is a hydrophilic normally liquid PEG, or ② the polyol component A of the structural formulae (I) to (IV) in which (AO) is any one selected from the above-mentioned polyetherpolyol such as hydrophobic normally liquid PPG, a block copolymer which does not include PEG as a copolymerized component or a random copolymer which does not include EO as a copolymerized component, and/or the polyol component A of the structural formulae (I) to (IV) comprising a hydrophilic normally liquid PEG, are reacted with the isocyanate component B of the structural formulae (V) to (VIII) in which (AO) is the above-mentioned normally liquid block copolymer or random copolymer including PEG or EO as a copolymerized component.

Then, a reaction ratio of the polyol component A and the polyisocyanate component B is explained. From our experience, it is necessary that an adhesive segmented polyurethane has bulky molecular structure and, at the same time, has segments which have such length as to permit free movement or has many free-movable end molecules of linear chain. Therefore, when each one of polyol and polyisocyanate is a compound of one kind, it is necessary to combine one compound which is bifunctional with the other compound which is trifunctional or more. When either of two compounds is monofunctional, chain is not formed. When both of them are bifunctional, since the obtained chain is linear, aggregation of bulky molecules cannot be formed, unless the prepolymer initially have side chains. Thus, each case is not proper. Namely, a combination in which one is bifunctional and the other or more is trifunctional or more, or a combination in which both are trifunctional or more is preferable. In either case, however, when the number of functional groups of the reaction compounds are so high, a concentration of network becomes too high. As a result, elasticity exceeds viscosity, and it is difficult to obtain preferable adhesive property unless a very long segment exists. A favorable number of functional groups of each component for obtaining good adhesive property is a combination of 2 to 4. In that case, it is possible to enhance bulkiness by mixing a monofunctional compound for regulating an adhesive property. For that purpose, polyetherpolyol of the structural formula (IV) in which R represents an alkyl group is mixed, and especially, poly (ethylene glycol) monomethyl ether (M—PEG) or the like is suitably used. This compound acts as a tackifier, and one having a molecular weight of about 150 to 1000, desirably about 200 to 600 is used because it is required to have an adequate chain length for obtaining an adhesive property in a liquid state.

A reaction ratio of the polyol component A and the polyisocyanate component B can be controlled by a ratio of end functional groups, that is a value of OH/NCO. The value of OH/NCO must be not less than 1 because when an unreacted —NCO remains, post-reaction occurs. From our experience, a segmented polyurethane having a good adhesive property is obtained in a range of $1 \leq OH/NCO \leq 5$. In the rangl of $1 \leq OH/NCO \leq 5$, it is supposed that a linear chain segment having an end OH group of a bulky molecule is freely movable like a tail. The ratio of OH/NCO comes near 5, the number and the length of the free tails increase. These polymer molecules aggregate in a suitable size to exhibit an adhesion property. Similarly, a tackifier such as the above-mentioned M—PEG and the like having an end blocked with an alkyl group and the like, forms a branched segment and is freely movable. Accordingly, an adhesion property can be regulated by variation of this degree of branch [P—OH/M—PEG]. The range of the degree of branch is desirably regulated so that the value of P—OH/M—PEG (molar ratio) may fall within the range of from about 2/1 to 2/5 because a smaller degree of branch does not contribute to increase of an adhesive property, and a larger degree of branch makes an unreacted M—PEG remain and then tends to result in undesirable decrease of an adhesive property.

When transdermal absorption formulations are prepared with the pressure sensitive adhesives for the transdermal absorption formulations comprising the above-mentioned segmented-polyurethane, first, a drug is dissolved in the above-mentioned polyol component A or the polyisocyanate component B, then both components are stirred to mix with or without adding catalyst to both of them. Therefore, a solvent or a free liquid component for dissolving drugs is not necessary, and the problem that those substances are absorbed via body surface is avoided. Any drug can be used provided that the drug may be dissolved in normally liquid alkylene oxide chains. Therefore a variaty of the drug is very wide. However, it is necessary to avoid a drug having a high ractivity with isocyanate. Subsequently, the polyol component A is reacted with the polyisocyanate component B by casting the resultant liquid mixture on a film substrate such as a polyester film and the like to obtain a segmented polyurethane including the drug. Then, a releasing paper may be laminated on its surface.

In this manner, though a drug is preferably dissolved in the polyol component A and/or the isocyanate component B which are the raw materials for production of the segmented polyurethane, the drug may also be dissolved after the production of the segmented polyurethane. In such a case, for example, there can be adopted a method in which the drug dissolved in a solvent such as ethanol or the like are absorbed in a gelatinous segmented polyurethane, and then the solvent is volatilized off.

The pressure sensitive adhesives for transdermal absorption formulations according to the present invention comprising the segmented polyurethane has a good dissolution, especially a good dissolution for wide range of solid drugs, and a good releasing property, because any segment is constituted of a normally liquid alkylene oxide chain, and because the pressure sensitive adhesives according to the first invention have the hydrophilic alkylene oxide chain and the hydrophobic alkylene oxide chain, the pressure sensitive adhesives according to the second invention have the alkylene oxide chain in which the hydrophilic moiety and the hydrophobic moiety are present in the mixed manner, and the pressure sensitive adhesives according to the third invention have the alkylene oxide chain in which the hydrophilic moiety and the hydrophobic moiety are present in the mixed manner, and the hydrophilic alkylene oxide chain and/or the hydrophobic alkylene oxide chain.

That is to say, in the pressure sensitive adhesives comprising a segmented polyurethane in an aggregated state of molecules, obtained by bonding the normally liquid alkylene oxides via urethane bond, the solid drugs are uniformly dissolved in a high affinity segment portion of the liquid segments, i.e. in a liquid segment portion which has a similar SP (Solubility Parameter) value to that of the drugs. In such a case, if the alkylene oxide chain is a block copolymer, the drugs are dissolved in a length of the block unit of the segment. Further, in the case of a random copolymer or an alternating copolymer, the drugs associate in a microdimension of neighboring monomer units, said manner being observed as if the drugs are dissolved in a solvent consisting of a low molecuar weight compound by associating with the solvent. And, it is the surprising fact that, in some cases, a higher dissolution effect is made than in case of a solvent of a low molecular weight compound by the polymer effect attributed to the effect of these chains. Such dissolved drugs graduately migrate from an interface of the pressure sensitive adhesive and a skin into the skin where a concentration is low, depending on a balance of the solubility. The drugs are takin into the living body, since the skin of the living body is a complicated system which has both hydrophilic components and hydrophobic components, and is able to dissolve and absorb a very small amount of the drugs migrated thereto.

More specifically explained, the normally liquid alkylene oxide chains are active in a molecular motion and are in a state of easily dissolving the drugs of low molecular weight compounds. When all of the alkylene oxide chains are hydrophilic, however, hydrophobic drugs which have low affinity with the chains are scarcely dissolved, and, to the contrary, when all of the alkylene oxide chains are hydrophobic, hydrophilic drugs are scarcely dissolved. However, when the segmented polyurethane has both hydrophilic and hydrophobic alkylene oxide chains like the pressure sensitive adhesive according to the first invention, when the segmented polyurethane has an alkylene oxide chain in which a hydrophilic moiety and a hydrophobic moiety are present in the mixed manner like the pressure sensitive adhesive according to the second invention, or when the segmented polyurethane has an alkylene oxide chain in which a hydrophilic moiety and a hydrophobic moiety are present in the mixed manner, and hydrophilic and/or hydrophobic alkylene oxide chains like the pressure sensitive adhesive according to the third invention, the drugs which are either hydrophilic or hydrophobic, are dissolved intensively in the alkylene oxide chain or the hydrophilic moiety or the hydrophobic moiety in the alkylene oxide chain which have a good affinity with the drugs. As a result, the drugs are included in the pressure sensitive adhesive with partial concentraiton gradient. Especially, the segmented polyurethane having an alkylene oxide chain comprising the random copolymer having the mixture of the hydrophilic moiety and the hydrophobic moiety has a low cohesion force, because the intermolecular force between the segment molecules is not effected and the monomer units in the molecular chain move in the manner of micro scopic free rotary motion. Therefore, such a segmented polyurethane is convenient for dissolving the drugs well with a minute concentration distribution. Further, if molecular design is previously made such that solubility parameter (SP value) of the alkylene oxide chain approaches that of the drugs, a dissolving property for the drugs is further enhanced.

The drugs included in the pressure sensitive adhesives with a partial concentration gradient, are easily movable, because the alkylene oxide chains are in a liquid state and the molecules thereof move vigorously. Therefore the drugs transfer from a high concentration portion to a low concentration portion, or from a low affinity portion to a high affinity portion, i.e. first transfer quickly to the surface of the pressure sensitive adhesives which has a low concentration, then are released into the skin. Especially when the alkylene oxide chain is the block copolymer, the transference or migration of the drugs is carried out in a macroscopic range, since each block is in active motion. Further when the alkylene oxide chain is the random copolymer, a higher dissolution force is obtained for certain drugs than that of a low molecular weight solvent, since smaller units are in active motion. These facts are surprising facts. In such a random copolymer, the transference of the drugs is easier. Therefore, the pressure sensitive adhesives having the normally liquid alkylene oxide chain comprising the block copolymer or the random copolymer, have a remarkably good releasing property of the drugs.

Examples of usable drugs are, for instance, antiarrhythmic agents such as propranolol hydrochloride, indenolol hydrochloride, bufetolol hydrochloride, oxprenolol hydrochloride, penbutolol and pindolol; antihypertensive agents such as metoprolol tartrate, bunitrolol hydrochloride, captopril and methoserpidine; coronary vasodilators such as nitroglycerin, isosorbide dinitrate, trolnitrate diphosphate, nifedipine, molsidomine, prenylamine lactate, dipyridamole, oxyfedrine hydrochloride and etafenone hydrochloride; peripheral vasodilators such as bamethan sulfate and tolazoline hydrochloride; cardiacs such as G-strophanthin, ubidecarenone, isoproterenol hydrochloride and norfenefrine hydrochloride; diuretics such as ethacrynic acid and penflutizide; angiotonics such as phenylephrine; the other agents for circulatory organs such as nicardipine hydrochloride, alprostadil and ifenprodil tartrate; agents for diabetes such as glibenclamide; agents for gout such as colchicine; hormone agents such as methyltestosterone and betamethasone; anti-inflammatory agents such as indometacin and ibuprofen; and the like. The other drugs may be usable.

The segmented polyurethane having the normally liquid alkylene oxide chain as a segment is a viscous, soft and clear colorless gelatinous material, and exhibits a good adhesion property and stickness to skin. Especially, an excellent adhesion property and stickness can be ontained by the segmented polyurethane which has a freely movable branched segment such as M—PEG, or the segmented polyurethane which has a linear segment having increased freely movable tails with an end OH group, the number of tails being increased by adjusting reaction ratio of the polyol and the polyisocyanate.

Further, the segmented polyurethane having as the segment the normally liquid alkylene oxide chain comprising the random copolymer is very soft because of local movement of the segment which has low cohesion force. Therefore, when applied to the skin, an effective contact area with a slightly rough skin is enlarged and the polyurethane exhibits a better adhesion property and stickness.

Comparing the segmented polyurethane having as the segment the normally liquid alkylene oxide chain comprising the random copolymer with the segmented polyurethane having as the segment the normally liquid alkylene oxide chain comprising the block copolymer, when applied to various plastic surfaces having different surface tensions, the case in which the block copolymer is included as the segment is superior in peel strength to the case in which the random copolymer is included as the segment. When applied to the human skin, however, the case in which the random copolymer is included as the segment is superior in peel strength to the case in which the block copolymer is included as the segment. This is attributed, as mentioned above, to softness and low cohesion strength of the segmented polyurethane having the random copolymer as the segment.

Particularly preferable segmented polyurethane has a peel strength from the human skin of 100 to 500 g/2.5 cm and an adhesion strength of 100 to 800 (peeling rate: 1000 mm/min). Peel strength is measured according to the method described in JIS-Z-0237, and adhesion strength is measured by the following method.

The segmented polyurethane sample is cut into a size of 120 mm×10 mm×2 mm, and wound around a holder having a diameter of 5 cm of Picma tack tester II made by Toyo Seiki Seisakusho Co. Ltd. Then, the holder is moved downward at a rate of 100 mm/min, and the cut sample is adhered to a stainless steal plate (obtained by polishing SUS-304 with a #208 water resistant abrasive paper) under conditions of a load for adhesion of 100 g and a time for adhesion of 1 second. Thereafter, the holder is raised at a peeling rate of 1000 mm/min to measure adhesion strength.

This good stickness is an indispensable condition for smooth migration of the drugs from the surface of the pressure sensitive adhesive to the skin. Corneum of a skin consists of very highly hydrophilic horny cells containing cytoplasm therein in the form of an aqueous solution of protein and very highly hydrophobic lipid containing a lot of triglycerides present in a gap between those cells. According to the pressure sensitive adhesives of the present invention, the drugs migrate smoothly into the inside of the skin, because the hydrophilic portion (the hydrophilic alkylene oxide chain or the hydrophilic portion in the alkylene oxide chain) and the hydrophobic portion (the hydrophobic alkylene oxide chain or the hydrophobic portion in the alkylene oxide chain) coexist in the pressure sensitive adhesives, the hydrophilic portion and the hydrophobic portion adequately influence on the two components of different nature, that is, the hydrophilic component and the hydrophobic component of corneum of the skin, consequently, and thus, as a whole, a good adhesion behavior is exhibited.

Further, the pressure sensitive adhesives of the invention do not reveal toxicity as a result of an acute toxicity test and an intradermal administration test for mouses and rabbits, and are pressure sensitive adhesives basically of one component type which is obtained by reacting the polyol component A and the polyisocyanate component B that are not toxic against human body. Therefore, the pressure sensitive adhesives of the invention do not contain a free components which bleeds out, and are very highly safe against human body. Also, the pressure sensitive adhesives of the invention are mild materials with extremely less stimulus against the skin, and have less possibility of contact dermatitis in comparison with acrylic type pressure sensitive adhesives for medical treatment. This is clear from the fact that segmented polyurethanes are used also for artificial hearts, and are substances which have been very intensively studied as bio-compatible materials.

BEST MODE FOR CARRYING OUT THE INVENTION

The present invention is more specifically explained by means of the following Examples. The present invention is not limited to the Examples.

Example 1

To a polyether polyol mixture were added 85 parts (parts by weight. hereinafter the same) of triisocyanate (molecular weight: 1650) and 0.1 parts of dibutyltin dilaurate as a catalyst and they were mixed with vigorous stirring; said polyether polyol mixture consisting of 100 parts of a PEG—PPG—PEG block copolymer obtained by bonding poly (ethylene glycol) (PEG: molecular weight: 200) to both ends of poly (propylene glycol) (PPG; molecular weight: 1200) and 60 parts of poly (ethylene glycol) monomethyl ether (M—PEG; molecular weight: 400), each of which being normally liquid, and said triisocyanate being obtained by reacting xylylene diisocyanate (XDI) with the compound obtained by adding PPG to glycerol and having normally liquid alkylene oxide chains as segments.

Then, after the resulting mixture was defoamed under reduced pressure, the mixture was casted on a polyester film and allowed to stand at 60° C. over a night and day to obtain a pressure sensitive adhesive for transdermal absorption formulations, made of the segmented polyurethane having a thickness of 100 μm. After laminating a releasing paper on the adhesive surface, the resulting structure was punched with a die into a size of 10 cm² to obtain a sticking patch to be tested.

The releasing paper of the sticking patch was taken off and the sticking patch was applied on the skin of the inner side of a human brachium, and a patch test was carried out. As a result of the test, the pressure sensitive adhesive for transdermal absorption formulations according to the present invention, made of the segmented polyurethane shows very good adhesion property to the skin, excellent stickness and flexibility, and does not make uncomfortable feeling when sticking to the skin. After 24 hours, the sticking patch was peeled off, and the condition of the skin was observed to find no change such as contact dermatitis.

Example 2

10 parts of ibuprofen was dissolved in a polyether polyol mixture, thereto were added 85 parts of triisocyanate (molecular weight: 1650) and 0.1 parts of dibutyltin dilaurate as a catalyst, and they were mixed with vigorous stirring; said polyether polyol mixture consisting of 100 parts of a PEG—PPG—PEG block copolymer obtained by bonding poly (ethylene glycol) (PEG; molecular weight: 200) to both ends of poly (propylene glycol) (PPG; molecular weight: 1200) and 60 parts of poly (ethylene glycol) monomethyl ether (M—PEG; molecular weight: 400), each of which being normally liquid, and said triisocyanate being obtained by reacting xylylene diisocyanate (XDI) with the compound obtained by adding PPG to glycerol and having normally liquid alkylene oxide chains as segments.

Then, after the resulting mixture was defoamed under reduced pressure, the mixture was casted on a polyester film and allowed to stand at 60° C. over a night and day to obtain a segmented polyurethane having a thickness of 100 μm including ibuprofen. After laminating a releasing paper on the adhesive surface, the resulting structure was punched with a die into a size of 25 cm² to obtain a transdermally absorbable patch including about 10 mg of ibuprofen.

The releasing paper of the transdermally absorbable patch was taken off and the transdermally absorbable patch was applied on the abdominial region of a rat, and a releasing property of ibuprofen was tested. As a result of measuring the change with lapse of time of a ibuprofen concentration in plasma after application, it was observed that the ibuprofen concentration in plasma increased in 1 to 1.5 hours after the start of the test, that the ibuprofen concentration of about 10 to 20 ng/ml was kept until 24 hours after, and that ibuprofen was absorbed at an approximately constant rate.

Example 3

6 parts of methyltestosterone was dissolved in 100 parts of a PEG—PPG random copolymer (molecular weight: 1800), and thereto were added 70 parts of triisocyanate (molecular weight: 3100) and 0.1 parts of dibutyltin dilaurate as a catalyst, and they were mixed with vigorous stirring; said triisocyanate being obtained by reacting hexamethylene diisocyanate (HMDI) with the compound obtained by adding a PEG—PPG random copolymer to glycerol and having normally liquid alkylene oxide chains as segments.

Then, after the resulting mixture was defoamed under reduced pressure, the mixture was casted on a polyester film and allowed to stand at 60° C. over a night and day to obtain a segmented polyurethane having a thickness of 80 μm including methyltestosterone. After laminating a releasing paper on the adhesive surface, the resulting structure was punched with a die into a size of 25 cm² to obtain a transdermally absorbable patch including about 5 mg of methyltestosterone.

The releasing paper of the transdermally absorbable patch was taken off and the transdermally absorbable patch was applied on the abdominal region of a rat, and releasing property of methyltestosterone was tested to find that a drug releasing rate after 48 hours is about 25 to 35%, indicating an exellent releasing ability of the transdermally absorbable patch. The drug releasing rate was calculated from the measured result of residual amount of methyltestosterone in the transdermally absorbable patch recovered after 48 hours.

Example 4

15 parts of betamethasone was dissolved in a polyether polyol mixture, thereto were added 120 parts of triisocyanate (molecular weight: 3100) and 0.1 parts of dibutyltin dilaurate as a catalyst, and they were mixed with vigorous stirring; said polyether polyol mixture consisting of 100 parts of a PEG—PPG—PEG block copolymer obtained by bonding poly (ethylene glycol) (PEG; molecular weight:335) to both ends of poly(propylene glycol) (PPG; molecular weight: 1000) and 34 parts of poly (ethylene glycol) monomethyl ether (M—PEG; molecular weight: 400), each of which being normally liquid, and said triisocyanate being obtained by reacting hametylene diisocyanate (HMDI) with the compound obtained by adding a PPG—PEG random copolymer to glycerol and having normally liquid alkylene oxide chains as segments.

Then, after the resulting mixture was defoamed under reduced pressure, the mixture was casted on a polyester film and allowed to stand at 60° C. over a night and day to obtain a segmented polyurethane having a thickness of 85 μm including betamethasone. After laminating a releasing paper on the adhesive surface, the resulting structure was punched with a die into a size of 10 cm$^2$ to obtain a transdermally absorbable patch including about 5 mg of betamethasone.

The releasing paper of the transdermally absorbable patch was taken off and the transdermally absorbable patch was applied on the abdominal region of a rat, and a releasing property of betamethasone was tested. A residual amount of betamethasone in the transdermally absorbable patch, recovered after 72 hours, was measured, and a drug releasing rate was calculated to be about 40 to 50%, indicating that the transdermally absorbable patch has good releasing ability.

Example 5

2.5 parts of glibenclamide was dissolved in 100 parts of a polyurethane polyol prepolymer, thereto were added 40 parts of a polyurethane polyisocyanate prepolymer and 0.1 parts of dibutyltin dilaurate as a catalyst, and they were mixed with vigorous stirring; said polyurethane polyol prepolymer being obtained by reacting poly (ethylene glycol) (PEG; molecular weight: 400) with the compound obtained by adding hexamethylene diisocyanate (HMDI) to both ends of poly (propylene glycol) (PPG; molecular weight: 600) and having normally liquid alkylene oxide chains as segments, and said polyurethane polyisocyanate prepolymer being obtained by reacting triisocyanate obtained by adding xylylene diisocyanate (XDI) to glycerol with both ends of PPG (molecular weight: 400) and having normally liquid alkylene oxide chains as segments.

Then, after the resulting mixture was defoamed under reduced pressure, the mixture was casted on a polyester film and allowed to stand at 60° C. over a night and day to obtain a segmented polyurethane having a thickness of 200 μm including glibenclamide. After laminating a releasing paper on the adhesive surface, the resulting structure was punched with a die into a size of 50 cm$^2$ to obtain a transdermally absorbable patch including about 18 mg of glibenclamide.

The releasing paper of the transdermally absorbable patch was taken off and the transdermally absorbable patch was applied on the abdominal region of a beagle, and a releasing property of glibenclamide was tested. As a result of measuring the change with lapse of time of a glibenclamide concentration in plasma after application, it was observed that the glibenclamide concentration in plasma increased in 1 hour after the start of the test, that the glibenclamide concentration of 20 to 30 ng/ml was kept until 24 hours after, and that glibenclamide was absorbed at an approximately constant rate.

Example 6

10 parts of colchicine was dissolved in 100 parts of a polyurethane polyisocyanate prepolymer, thereto were added 100 parts of polyether polyol, 60 parts of poly (ethylene glycol) monomethyl ether (M—PEG; molecular weight: 400) and 0.1 parts of dibutyltin dilaurate as a catalyst, and they were mixed with vigorous stirring; said polyurethane polyisocyanate prepolymer being obtained by reacting hexamethylene diisocyanate with both ends of poly (ethylene glycol) (PEG; molecular weight: 400) and said polyether polyol being obtained by bonding poly (propylene glycol) (PPG; molecular weight: 300) to glycerol and having normally liquid alkylene oxide chains as segments.

Then, after the resulting mixture was defoamed under reduced pressure, the mixture was casted on a polyester film and allowed to stand at 60° C. over a night and day to obtain a segmented polyurethane having a thickness of 160 μm including colchicine. After laminating a releasing paper on the adhesive surface, the resulting structure was punched with a die into a size of 10 cm$^2$ to obtain a transdermally absorbable patch including about 6 mg of colchicine.

The releasing paper of the transdermally absorbable patch was taken off and the transdermally absorbable patch was applied on the abdominal region of a rat, and a releasing property of colchicine was tested to observe that a colchicine concentration in plasma increased in 1 hour after application, that the colchicine cocentration in plasma of 5 to 10 ng/ml was kept until 24 hours after, and that colcicine was absorbed at an approximately constant rate.

INDUSTRIAL APPLICABILITY

As evident from the above-description, pressure sensitive adhisives for transdermal absorption formulations according to the present invention have notable effects that the adhesives have a good dissolution and releasing property of drugs, especailly solid drugs, that they are highly safe for human body, that they are flexible and have a good adhesion strength and stickness to skin, and that they generate a good feeling and compatibility when applied to the skin, thus the adhesives have extremely high utility.

We claim:

1. Pressure sensitive adhesives for transdermal absorption formulations comprising a segmented polyurethane having, as a main chain, a segment which comprises a random copolymer of ethylene oxide and propylene oxide and which is in a liquid state at a temperature of about 0° C. to about 40° C., and as a dangling chain, poly(ethylene glycol) monomethyl ethers.

2. The pressure sensitive adhesives for transdermal absorption formulations of claim 1, wherein a molar ratio of the ethylene oxide to the propylene oxide in the random copolymer is 6/4 to 3/7.

3. Pressure sensitive adhesives for transdermal absorption formulations comprising a segmented polyurethane prepared by a polyol component which is a diol having a random copolymer segment which is in a liquid state at a temperature of about 0° to about 40° C. and an isocyanate component which is a triisocyanate having a random copolymer segment which is in a liquid state at a temperature of about 0° C. to about 40° C., said segmented polyurethane having a dangling chain of poly(ethylene glycol) monomethyl ether.

4. The pressure sensitive adhesives for transdermal absorption formulations of claim 3, wherein a molar ratio of the poly (ethylene glycol) monomethyl ether to the polyol is 1/2 to 5/2.

5. The pressure sensitive adhesives of claim 4, wherein the segmented polyurethane has a peel strength from human skin of 100 to 500 g/2.5 cm measured according to the method described in JIS-Z-0237 at a body temperature and an adhesion strength of 100 to 800 at a peeling rate of 1000 mm/min measured at room temperature by using a test sample of 120 mm×10 mm.

6. The pressure sensitive adhesives of claim 3, wherein the segmented polyurethane has a peel strength from human skin of 100 to 500 g/2.5 cm measured according to the method described in JIS-Z-0237 at a body temperature and an adhesion strength of 100 to 800 at a peeling rate of 1000 mm/min measured at room temperature by using a test sample of 120 mm×10 mm.

7. Method of use for pressure sensitive adhesives for transdermal absorption formulations comprising a segmented polyurethane having, as a main chain, a segment which comprises a random copolymer of ethylene oxide and propylene oxide and which is in a liquid state at a temperature of about about 0° C. to about 40° C. and as a dangling chain, poly(ethylene glycol) monomethyl ethers.

8. The method of claim 7, wherein a molar ratio of the ethylene oxide to the propylene oxide in the random copolymer is 6/4 to 3/7.

9. Method of use for pressure sensitive adhesives for transdermal absorption formulations comprising a segmented polyurethane prepared by a polyol component which is a diol having a random copolymer segment which is in a liquid state at a temperature of about 0° C. to about 40° C. and an isocyanate component which is a triisocyanate having a random copolymer segment which is in a liquid state at a temperature of about 0° C. to about 40° C., said segmented polyurethane having a dangling chain of poly(ethylene glycol) monomethyl ethers.

10. The method of claim 9, wherein a molar ratio of the poly(ethylene glycol) monomethyl ethers to the polyol is 1/2 to 5/2.

* * * * *